(12) United States Patent
Xiao et al.

(10) Patent No.: US 11,001,534 B2
(45) Date of Patent: May 11, 2021

(54) SEMI-TRANSPARENT CERAMIC SHEET DECORATED WITH INK LIGHT-ABSORBANCE AND PREPARATION METHOD THEREOF

(71) Applicant: MONALISA GROUP CO., LTD, Foshan (CN)

(72) Inventors: Libiao Xiao, Foshan (CN); Limin Pan, Foshan (CN); Zhouqiang Fan, Foshan (CN); Yijun Liu, Foshan (CN); Junle Dong, Foshan (CN); Lingyan Huang, Foshan (CN)

(73) Assignee: MONALISA GROUP CO., LTD., Foshan (CN)

( * ) Notice: Subject to any disclaimer, the term of this patent is extended or adjusted under 35 U.S.C. 154(b) by 0 days.

(21) Appl. No.: 16/496,025

(22) PCT Filed: Mar. 16, 2018

(86) PCT No.: PCT/CN2018/079269
§ 371 (c)(1),
(2) Date: Sep. 20, 2019

(87) PCT Pub. No.: WO2018/171517
PCT Pub. Date: Sep. 27, 2018

(65) Prior Publication Data
US 2020/0140344 A1    May 7, 2020

(30) Foreign Application Priority Data

Mar. 24, 2017  (CN) .......................... 201710182955.7

(51) Int. Cl.
*B32B 3/00*       (2006.01)
*C04B 41/45*      (2006.01)
(Continued)

(52) U.S. Cl.
CPC .............. *C04B 41/458* (2013.01); *B32B 3/00* (2013.01); *C04B 35/14* (2013.01); *C04B 41/009* (2013.01);
(Continued)

(58) Field of Classification Search
CPC ...... B32B 3/00; C04B 41/458; C04B 41/4578
See application file for complete search history.

(56) References Cited

U.S. PATENT DOCUMENTS 5,714,236 A    2/1998   Withington et al.

FOREIGN PATENT DOCUMENTS

CN    101898887 A    12/2010
CN    102795892 A    11/2012
(Continued)

*Primary Examiner* — Elizabeth E Mulvaney
(74) *Attorney, Agent, or Firm* — Alleman Hall Creasman & Tuttle LLP

(57) ABSTRACT

Disclosed are a semi-transparent ceramic sheet decorated through ink light-absorbance and a preparation method thereof. The semi-transparent ceramic sheet comprises a semi-transparent green body, an inner inkjet pattern layer infiltrating into the semi-transparent green body from an upper surface of the semi-transparent green body, a decoloration glaze layer located on the upper surface, and a surface pattern layer located on the decoloration glaze layer. The decoloration glaze layer is capable of decoloring the ink of the inner inkjet pattern layer. The semi-transparent ceramic sheet is provided with the decoloration glaze layer so that the inkjet decoration of the inner inkjet pattern layer cannot be displayed on the surface, and the decorative pattern on the surface of the green body is the surface pattern layer and the inner inkjet pattern layer is completely in the inner layer of the green body.

9 Claims, 1 Drawing Sheet

(51) Int. Cl.
    *C04B 35/14*     (2006.01)
    *C04B 41/00*     (2006.01)
    *C04B 41/50*     (2006.01)
    *C04B 41/52*     (2006.01)
    *C04B 41/89*     (2006.01)

(52) U.S. Cl.
    CPC ...... *C04B 41/4535* (2013.01); *C04B 41/5022* (2013.01); *C04B 41/522* (2013.01); *C04B 41/89* (2013.01); *C04B 2235/3284* (2013.01); *C04B 2235/349* (2013.01); *C04B 2235/3418* (2013.01); *C04B 2235/3445* (2013.01); *C04B 2235/3472* (2013.01); *C04B 2235/5445* (2013.01)

(56) References Cited

FOREIGN PATENT DOCUMENTS

| | | |
|---|---|---|
| CN | 105367131 A | 3/2016 |
| CN | 105367134 A | 3/2016 |
| CN | 105777089 A | 7/2016 |
| CN | 107010976 A | 8/2017 |

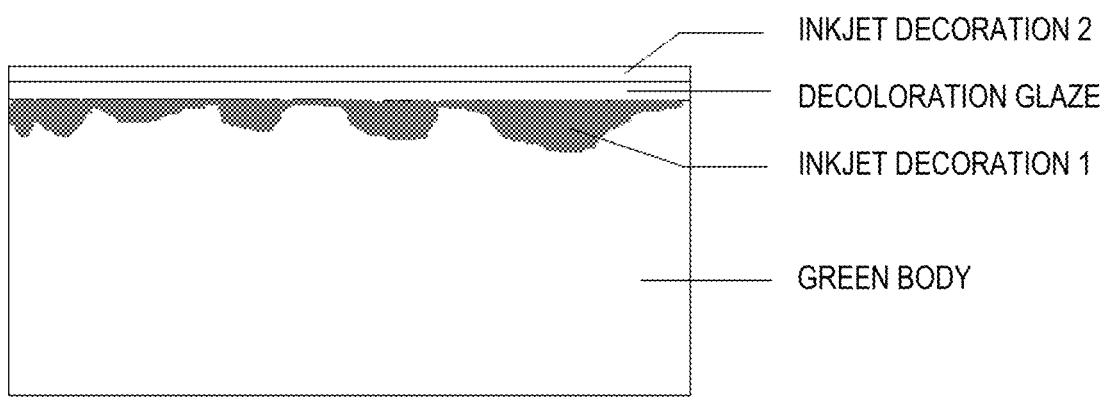

SEMI-TRANSPARENT CERAMIC SHEET DECORATED WITH INK LIGHT-ABSORBANCE AND PREPARATION METHOD THEREOF

TECHNICAL FIELD

The present invention relates to the technical field of architectural ceramics, in particular to a semi-transparent ceramic sheet decorated with ink light-absorbance and a preparation method thereof.

BACKGROUND

Semi-transparent ceramic sheets, because of their special semi-transparent performance, are popular among consumers on some special occasions. At present, an inner layer in a green body of the semi-transparent ceramic sheet on the market has no decoration or monotonous-pattern decoration. For example, Chinese patent application No. 201010122751.2 discloses a green body with a non-decorative inner layer. Chinese patent application No. 201610208026.4 discloses that semi-transparent green body materials and opaque green body materials are distributed by using a 'magician' material-distribution system, to form a light and dark decorative effect through different absorptions of light. There are some disadvantages such as nonuniform distribution of the semi-transparent green body materials and the opaque green body materials, unclear expression of details, poor gradation of a decorative pattern, complex technology, and poor flexibility. Moreover, the opaque green body materials have a sintering temperature 20 to 30° C. higher than the semi-transparent green body materials, and thus they are poorly combined after sintering, resulting in poor thermal stability and incapability to meet production and decoration demands.

SUMMARY

Technical Problem

The present invention solves a problem in which the inner layer in the green body of the semi-transparent ceramic sheet in the prior art has no decoration, or monotonous-pattern decoration, and the process is complicated. Provided is a semi-transparent ceramic sheet decorated with ink light-absorbance, which has a good light transmission performance, unified green body materials, rich details of the inner layer of the green body, a simple process, and flexible and changeable decorative patterns of the inner layer of the green body.

Technical Solution

In one aspect, provided is a semi-transparent ceramic sheet decorated with ink light-absorbance, comprising: a semi-transparent green body, an inner inkjet pattern layer infiltrating into the semi-transparent green body from the upper surface of the semi-transparent green body, a decoloration glaze layer located on the upper surface of the semi-transparent green body, and a surface pattern layer located on the decoloration glaze layer.

The decoloration glaze layer is capable of decoloring the ink of the inner inkjet pattern layer. The semi-transparent ceramic sheet is provided with the decoloration glaze layer on the surface of the green body, so that the inkjet decoration of the inner inkjet pattern layer disappears on the surface, and the decorative pattern on the surface of the green body is merely the surface pattern layer, while the inner inkjet pattern layer is completely within the green body. The semi-transparent ceramic sheet has unified green body materials and excellent thermal stability. Furthermore, the inner layer of the green body is rich in detail, can be formed through inkjet technology, and has a simple process. In addition, the details of the pattern can be adjusted at will with a high flexibility, and a light and dark decorative effect full of variety can be formed through different light absorptions of the patterns with different gray levels.

The infiltration depth of the inner inkjet pattern layer into the semi-transparent green body may be 1 to 2 mm. The inner inkjet pattern layer infiltrates into the semi-transparent green body to a certain depth, and thus a decorative effect with a richer gradation can be obtained.

Preferably, the thickness of the decoloration glaze layer is 0.04 to 0.1 mm.

In another aspect, provided is a method for manufacturing the semi-transparent ceramic sheet, the method comprising the steps of:

preparing a semi-transparent green body;

applying a decoloration glaze on the semi-transparent green body;

applying a first inkjet infiltrating ink on the decoloration glaze, wherein the decoloration glaze is capable of decoloring the first inkjet infiltrating ink in the decoloration glaze layer; and after the first inkjet infiltrating ink having completely infiltrated into the decoloration glaze, applying a second inkjet non-infiltrating ink on the decoloration glaze, and then sintering, to obtain the semi-transparent ceramic sheet.

In the present application, the surface of the green body is coated with a layer of decoloration glaze, which is able to decolor the first inkjet infiltrating ink, making the inkjet decoration of the first inkjet infiltrating ink not appear on the surface, and does not decolor the second inkjet non-infiltrating ink (a second inkjet ordinary ceramic ink), and therefore, the decorative pattern on the surface of the green body is merely the decorative pattern formed by the second inkjet ordinary ceramic ink (which is an ordinary ceramic ink incapable of infiltrating, i.e., a non-infiltrating ink), while the decorative pattern formed by the first inkjet infiltrating ink is completely in the inner layer of the green body. The pattern decoration of the inner layer of the green body is formed through inkjet technology, so the details of the pattern can be adjusted at will with a high flexibility, and a light and dark decorative effect full of variety can be formed through different light absorptions of the patterns with different gray levels. Moreover, there is no need to introduce other green body materials different from the base green body material, so excellent thermal stability is provided.

Preferably, the formula of the semi-transparent green body is: 0 to 9 parts of ultra-white kaolin, 8 to 15 parts of C30 soil (C30 soil is a kind of high-viscosity kaolin, which has a plasticity index of 17 or higher, and can be purchased, for example, from Foshan Shiyijin Ceramic Material Co., LTD.), 15 to 35 parts of quartz, 2 to 20 parts of fused silica, 8 to 20 parts of calcined talc powder, 20 to 35 parts of potassium feldspar powder, 3 to 7 parts of bentonite, 1 to 4 parts of W enhancer (W enhancer is a kind of green body enhancer, and can be purchased, for example, from Bonide (Shanghai) Ceramic Glaze Co., LTD.), and 2 to 8 parts of nano quartz. The semi-transparent green body formed from the formula has an excellent wet strength, color-aiding performance and light transmittance.

Preferably, the formula of the decoloration glaze is: 0 to 9 parts of ultra-white kaolin, 8 to 15 parts of C30 soil, 15 to 35 parts of quartz, 2 to 20 parts of fused silica, 8 to 20 parts of calcined talc powder, 20 to 35 parts of potassium feldspar powder, 3 to 7 parts of bentonite, and 0.5 to 5 parts of nano zinc oxide. The decoloration glaze contains nano zinc oxide, which can react with the metal iron oxide in the ink at a high temperature, and decolor the ink to achieve thorough decolorization.

Preferably, the primary particle size of the nano zinc oxide is less than 800 nm, preferably 50 nm to 300 nm. According to the application, an excellent decoloration effect can be obtained at a lower cost.

Preferably, the first inkjet infiltrating ink is an inkjet infiltrating brown ink. At a high temperature, the metal iron oxide in the inkjet infiltrating brown ink has high reactivity, and, without the coating of nano quartz, is easy to react with the decoloration glaze and the nano zinc oxide to be reduced or converted to other substances, thus losing its color.

Preferably, the moisture content of the semi-transparent green body is controlled to be 0.4% or less.

Preferably, the sintering temperature is 1150 to 1230° C.

Advantageous Effect

The present application provides a semi-transparent ceramic sheet decorated with ink light-absorbance, which has good light transmission performance, unified green body materials, rich detail of the inner layer of the green body, a simple process, and flexible and changeable decorative patterns of the inner layer of the green body.

BRIEF DESCRIPTION OF THE DRAWINGS

FIG. 1 shows a sectional drawing of a semi-transparent ceramic sheet decorated with ink light-absorbance.

DETAILED DESCRIPTION

The present application will be further described with the following embodiments below with reference to the drawings. It should be understood that the drawings and the following embodiments are only used for explaining this invention, and do not limit this invention. Unless otherwise specified, the content percentages described herein are all mass (weight) percentages.

FIG. 1 shows a sectional drawing of a semi-transparent ceramic sheet decorated with ink light-absorbance according to the application. As shown in FIG. 1, the semi-transparent ceramic sheet comprises: a semi-transparent green body (green body), an inner inkjet pattern layer infiltrating into the semi-transparent green body from the upper surface of the semi-transparent green body (inkjet decoration 1), a decoloration glaze layer located on the upper surface of the semi-transparent green body (decoloration glaze), and a surface pattern layer located on the decoloration glaze layer (inkjet decoration 2). "Semi-transparent" herein refers to a light transmittance between 10% and 45%. The semi-transparent ceramic sheet and its preparation method are described in detail as follows.

Semi-Transparent Green Body

The formula of the semi-transparent green body can be as follows: by weight, 0 to 9 parts of ultra-white kaolin, 8 to 15 parts of C30 soil, 15 to 35 parts of quartz, 2 to 20 parts of fused silica, 8 to 20 parts of calcined talc powder, 20 to 35 parts of potassium feldspar powder, 3 to 7 parts of bentonite, 1 to 4 parts of W enhancer, and 2 to 8 parts of nano quartz.

The complete chemical analysis thereof is: 3.8 to 4.52 parts of IL (ignition loss), 67.68 to 80.34 parts of $SiO_2$, 10.1 to 15.5 parts of $Al_2O_3$, 0.10 to 0.45 parts of $Fe_2O_3$, 0.31 to 1.4 parts of $TiO_2$, 0.1 to 0.7 parts of CaO, 2.1 to 3.8 parts of MgO, 2.5 to 4.2 parts of $K_2O$, and 0.7 to 1.5 parts of $Na_2O$.

The raw materials in the formula are mainly rigid materials, the green body formed from which by pressing and molding has a poor wet strength, and tends to break on the glaze line, and therefore, C30 soil which has a strong plasticity is introduced into the formula to improve the wet strength of the green body quickly. C30 soil is a kind of high-viscosity kaolin and its plasticity index is 17 or higher. The complete chemical analysis of the C30 soil may be: 5.62 parts of IL, 67.28 parts of $SiO_2$, 17.83 parts of $Al_2O_3$, 0.45 parts of $Fe_2O_3$, 0.01 parts of $TiO_2$, 0.13 parts of CaO, 0.55 parts of MgO, 1.34 parts of $K_2O$, and 0.36 parts of $Na_2O$. The content of the C30 soil may be 8 to 15 parts by weight, so that the wet strength of the green body can be effectively improved, and the green body is not easy to craze during subsequent glaze spraying and drying.

In order to improve the color of the ink, raw materials of the green body do not contain some common raw materials such as wollastonite, calcium carbonate, barium carbonate, alumina, and zinc oxide, and contain nano quartz as a red color rendering aid for brown ink. In the present application, nano quartz refers to the quartz with a nano particle size. For example, the nano quartz can have a particle size of 1 nm to 100 nm and a specific surface area of more than 150 $m^2/g$. The content of the nano quartz may be 2 to 8 parts by weight, so that the color performance of the brown ink can be improved, and the brown ink shows a deeper and redder color.

In order to further improve the light transmittance of the green body, the green body materials contain fused silica. When sintered at a high temperature, the fused silica forms a liquid phase earlier than the quartz, and the fused silica in the liquid phase coats and dissolves the quartz, promoting the melting of the quartz, so that the light transmittance is increased. In addition, the fused silica has a low expansion coefficient, and reduces the deformation caused by the mismatch between the expansion coefficients of the green body and the glaze. The content of the fused silica may be 2 to 20 parts by weight, whereby the expansion coefficient of the green body can be effectively reduced, and the light transmittance of the green body can be improved.

W enhancer refers to a green body enhancer, which can increase the strength of the green body.

Preparation and drying of the green body: a ceramic sheet green body is prepared according to a conventional preparation method of the green body (e.g. by the steps of mixing, granulating, molding, etc.), and dried. For example, the drying temperature is 150 to 165° C., and the drying duration is 45 to 60 minutes. The moisture content can be controlled to be 0.4% or less after drying. A semi-transparent ceramic sheet can be provided, so the thickness of the semi-transparent green body is preferably 6 mm or less.

Decoloration Glaze Layer and Inner Inkjet Pattern Layer

Decoloration glaze is applied on the semi-transparent green body for forming a decoloration glaze layer. A designed decorative pattern is inkjet printed on the decoloration glaze layer by using a first inkjet infiltrating ink. In the present application, the decoloration glaze refers to a glaze capable of decoloring the first inkjet infiltrating ink. Due to the decoloration glaze being capable of decoloring the first inkjet infiltrating ink, the color of the first inkjet infiltrating ink will not appear in the decoloration glaze layer. And the first inkjet infiltrating ink can infiltrate into the green body through the decoloration glaze layer, so the color and the pattern of the first inkjet infiltrating ink can appear in the green body, that is, an inner inkjet pattern layer is formed. In the application, the pattern decoration of the inner layer is formed through inkjet technology, so the details of the pattern can be adjusted at will with a high flexibility, and a light and dark decorative effect full of variety can be formed through different light absorptions of the patterns with different gray levels.

The selection of the decoloration glaze and the first inkjet infiltrating ink can be unrestricted, as long as the decoloration glaze is able to decolor the first inkjet infiltrating ink. In one example, the formula of the decoloration glaze is: by weight, 0 to 9 parts of ultra-white kaolin, 8 to 15 parts of C30 soil, 15 to 35 of parts quartz, 2 to 20 of parts fused silica, 8 to 20 parts of calcined talc powder, 20 to 35 parts of potassium feldspar powder, 3 to 7 parts of bentonite, and 0.5 to 5 parts of nano zinc oxide. The complete chemical analysis thereof is: 3.8 to 4.52 parts of IL, 60.68 to 75.34 parts of $SiO_2$, 10.1 to 15.5 parts of $Al_2O_3$, 0.10 to 0.45 parts of $Fe_2O_3$, 0.31 to 1.4 parts of $TiO_2$, 0.1 to 0.7 parts of CaO, 2.1 to 3.8 parts of MgO, 2.5 to 4.2 parts of $K_2O$, 0.7 to 1.5 parts of $Na_2O$, and 0.5 to 5 parts of ZnO. The first inkjet infiltrating ink can be an inkjet infiltrating brown ink.

The metal iron oxide in an inkjet infiltrating brown ink, when coated by nano quartz, can present stable color at a high temperature. In the present application, in order to achieve a decoloration effect, the decoloration glaze does not contain nano quartz. To make the decoloration more thorough, the decoloration glaze contains nano zinc oxide, which can react with the metal iron oxide in the ink at a high temperature, and make the metal iron oxide lose its color, so that thorough decoloration is realized.

The primary particle size of the nano zinc oxide can be less than 800 nm, preferably 50 nm to 300 nm. The primary particle size refers to the size of the primary particles in agglomerated particles of nanometer materials. The specific surface area of the nano zinc oxide can be more than 30 $m^2/g$, preferably more than 150 $m^2/g$. The stacking pore size of the nano zinc oxide can be less than 400 nm, preferably less than 100 nm.

The nano zinc oxide with the above particle size has higher reactivity with the metal iron oxide in the ink, so the decolorization effect can be obtained with a less content (0.5 to 5 parts by weight, preferably 0.5 to 2.5 parts by weight) of nano zinc oxide. When the primary particle size of the nano zinc oxide is more than 800 nm and the additive amount thereof is less than 2.5%, the reactivity of the nano zinc oxide with the metal iron oxide in the ink is reduced, and the thorough decoloration could not be achieved. When the additive amount thereof is higher than 2.5%, the thorough decoloration can be achieved, but the raw material cost is increased. Therefore, selected is the nano zinc oxide with a primary particle size of less than 800 nm.

The types of nano zinc oxide mainly include fumed nano zinc oxide, precipitated nano zinc oxide, nano zinc oxide aerogel, and molecular sieve, but not limited thereto, and include all nano zinc oxides prepared by different production principles and processes.

Preparation of the decoloration glaze layer: a decoloration glaze is sprayed on a dried green body. The decoloration glaze may have a fineness of 325 mesh with sieve residues of 0.5 to 0.8, and a specific gravity of 1.78 to 1.87. The weight of the glaze as sprayed can be 280 to 400 $g/m^2$, and the specific gravity thereof can be 1.5 to 1.55. The thickness of the decoloration glaze layer after sintering can be controlled at 0.04 to 0.1 mm, preferably 0.07 to 0.09 mm. If the thickness is too small, the color of the brown ink in the green body layer cannot be completely covered. If the thickness is too large, the moisture of the glaze layer is difficult to dry, and the glaze layer is easy to crack when drying. After applying the decoloration glaze layer, the green body can be dried again with a drying temperature of 80 to 120° C. and a drying duration of 10 to 20 minutes. After drying, the moisture is controlled to be 0.8% or less.

Preparation of the inner inkjet pattern layer: subjecting the ceramic sheet green body glazed with a decoloration glaze to a digital inkjet printer for inkjet printing to form designed decorative pattern. Ink (the first inkjet infiltrating ink) can use an inkjet infiltrating brown ink and a penetrant. The relationship between the jetting amounts of the ink and the penetrant may be that the sum of the gray scales of the ink and the penetrant is 100%. In order to obtain a rich decorative effect of the inner layer of the green body, the ink is printed by a multi-channel inkjet printer, and that makes the ink quantity increase and the ink completely infiltrate through the glaze layer into the green body layer. The ink can infiltrate into the green body layer to a depth of 1 to 2 mm. Under light, the brown ink of the inner layer of the green body absorbs light and forms the light and dark decorative pattern with rich details.

After applying the first inkjet infiltrating ink, the green body can be left standing for 3 minutes or more, for example 3 to 5 minutes, to ensure the infiltration depth of the ink.

After the first inkjet infiltrating ink having completely infiltrated into the decoloration glaze, a designed decorative pattern is formed on the decoloration glaze by inkjet printing using a digital inkjet printer. There are no special restrictions on the ink (a second inkjet ordinary ceramic ink). For example, ordinary ceramic inks supplied by ink companies on the market can be used. The colors provided are mainly brown, orange, yellow, blue, and black. The second spraying ink is an ordinary ceramic ink, which has no infiltrating properties and only forms color on the surface of the decoloration glaze.

Sintering is performed after applying the second inkjet ordinary ceramic ink. The firing temperature can be 1150 to 1230° C. The firing duration can be 45 to 75 minutes. The semi-finished semi-transparent ceramic sheet after sintering is subjected to edging, grading, and packaging, followed by storage.

Because of the decoloration glaze layer sprayed on the green body, the inkjet decoration of the first inkjet infiltrating ink cannot appear on the surface, so that the decorative pattern on the surface is the inkjet decoration pattern of the second inkjet ordinary ceramic ink, while the decorative pattern of the first inkjet infiltrating ink is completely in the inner layer of the green body. The pattern decoration of the inner layer of the green body is formed through an inkjet technology, so the details of pattern can be adjusted at will with a high flexibility, and the light and dark decorative effect full of variety can be formed through different light absorptions of the patterns with different gray levels. Provided is a semi-transparent ceramic sheet decorated with ink light-absorbance, which has better light transmission performance, a unified green body material, rich details of the inner layer of the green body, a simple process, and flexible and changeable decorative patterns of the inner layer of the green body. The size of the semi-transparent ceramic sheet can be (800 to 1600) mm×(1200 to 2400) mm×(3 to 6) mm.

Hereinafter, the present invention will be better described with the following representative examples. It should be understood that the following examples are only used to explain this invention and do not limit the scope of this invention. Any non-essential improvements and modifications made by a person skilled in the art based on this invention are all protected under the scope of this invention. The specific parameters below are only exemplary, and a person skilled in the art can choose proper values within an appropriate range according to the description of this article, and are not restricted to the specific values cited below.

Test Method:

Water absorption: according to the determination of water absorption in GB/T 3810.3-2006 Test Methods of Ceramic Tiles-Part 3;

Particle size: using KW510 Wet Automatic Laser Particle Size Analyzer;

Specific surface area: using 3H-2000PS2 Nanomaterial Specific Surface Area and Pore Size Analyzer;

Stacking pore size: using 3H-2000PS2 Nanomaterial Specific Surface Area and Pore Size Analyzer;

Light transmittance: using 77C-1 Intelligent Porcelain Body Light Transmittance Instrument.

Example 1

1. Preparation of the green body material of the semi-transparent ceramic sheet: the formula of the semi-transparent green body is: 9 parts of ultra-white kaolin, 12 parts of C30 soil (purchased from Foshan Shiyijin Ceramic Material Co., LTD.), 30 parts of quartz, 15 parts of fused silica, 13 parts of calcined talcum powder, 22 parts of potassium feldspar powder, 4 parts of bentonite, 2 parts of W enhancer (purchased from Bonide (Shanghai) Ceramic Glaze Co., LTD.), and 4 parts of nano quartz. The complete chemical analysis thereof is: 4.25 parts of IL, 74.98 parts of $SiO_2$, 13.4 parts of $Al_2O_3$, 0.15 parts of $Fe_2O_3$, 0.14 parts of $TiO_2$, 0.46 parts of CaO, 3.56 parts of MgO, 2.29 parts of $K_2O$, and 0.72 parts of $Na_2O$.

The raw materials in the formula are mainly rigid materials, the green body formed from which by pressing and molding has a poor wet strength, and tends to break on the glaze line, and therefore, C30 soil which has a strong plasticity is introduced into the formula to improve the wet strength of the green body quickly. The complete chemical analysis of the C30 soil is: 5.62 parts of IL, 67.28 parts of $SiO_2$, 17.83 parts of $Al_2O_3$, 0.45 parts of $Fe_2O_3$, 0.01 parts of $TiO_2$, 0.13 parts of CaO, 0.55 parts of MgO, 1.34 parts of $K_2O$, and 0.36 parts of $Na_2O$.

In order to improve the color of the ink, the raw materials of the green body do not contain some common raw materials such as wollastonite, calcium carbonate, barium carbonate, alumina, and zinc oxide, but contain nano quartz which is used as a red color rendering aid for the brown ink. The nano quartz is purchased from Shanghai Metco Color Material Co., LTD., having a model number of NMSIO900 and a particle size of 10 to 25 nm.

In order to further improve the light transmittance of the green body, the green body materials contain fused silica. When sintered at a high temperature, the fused silica forms a liquid phase earlier than the quartz, and the fused silica in the liquid phase coats and dissolves the quartz, promoting the melting of the quartz, so that the light transmittance is increased. In addition, the fused silica has a low expansion coefficient, and reduces the deformation caused by the mismatch between the expansion coefficients of the green body and the glaze.

2. Preparation and drying of the green body: according to the formula of the semi-transparent green body, all raw materials are mixed and then subjected to spray granulation and pressing to give a ceramic sheet green body, followed by drying at 155° C. for 55 minutes. The moisture after drying is controlled at 0.4%. The thickness of the prepared green body is 5.6 mm.

3. Preparation of the decoloration glaze: the formula is: 9 parts of ultra-white kaolin, 12 parts of C30 soil, 30 parts of quartz, 15 parts of fused silica, 18 parts of calcined talcum powder, 22 parts of potassium feldspar powder, 4 parts of bentonite, and 2 parts of nano zinc oxide. The complete chemical analysis is: 4.45 parts of IL, 73.08 parts of $SiO_2$, 13.66 parts of $Al_2O_3$, 0.13 parts of $Fe_2O_3$, 0.14 parts of $TiO_2$, 0.63 parts of CaO, 4.66 parts of MgO, 2.34 parts of $K_2O$, and 0.66 parts of $Na_2O$. The decoloration glaze has a fineness of 325 mesh with sieve residues of 0.5 to 0.8, and a specific gravity of 1.78 to 1.87.

The metal iron oxide in the inkjet infiltrating brown ink, when coated by nano quartz, can present stable color at a high temperature. Herein, in order to achieve a decoloration effect, the decoloration glaze does not contain nano quartz. To make the decoloration more thorough, the decoloration glaze contains nano zinc oxide, which can react with the metal iron oxide in the ink at a high temperature, and make the metal iron oxide lose its color, so that the thorough decoloration is realized.

In example 1, nano zinc oxide is purchased from Shanghai Metco Color Materials Co., LTD., having a model number of NMZN003, a primary particle size of 400 nm, a specific surface area of 165 $m^2/g$, and a stacking pore size of 75 nm.

4. Spraying of the decoloration glaze: the decoloration glaze prepared in step 3 is sprayed on the green body dried in step 2. The weight of the glaze sprayed is 330±3 $g/m^2$, and the specific gravity of the glaze is 1.52, and the thickness of the glaze sprayed is controlled in such a manner that the thickness of the glaze layer after sintering is 0.08 mm.

5. Re-drying: the ceramic sheet green body prepared in step 4 is dried again at 95° C. for 15 minutes, and the moisture thereof is controlled at 0.65%.

6. Inkjet decoration of the inner layer of the green body: the ceramic sheet green body prepared in step 5 is subjected to a digital inkjet printer for inkjet printing to form the designed decorative pattern. The ink uses the inkjet infiltrating brown ink provided by Shanghai Metco color material Co., LTD. (model number: INKMET L253MB1) and the penetrant (model number: MET FLUID BS).

The metal iron oxide in the inkjet infiltrating brown ink at a high temperature is highly reactive, and, without the coating of nano quartz, can easily react with the decoloration glaze and the nano zinc oxide to be reduced or converted to other substances, thus losing its color. However, metal oxides in inkjet infiltration blue or yellow or black ink are stable, and do not react with the decoloration glaze or the nano zinc oxide at a high temperature, making the decoloration glaze unable to decolor the ink. Therefore, only the inkjet infiltrating brown ink is selected.

In order to obtain rich a decorative effect of the inner layer of the green body, four channels are used for brown ink, and two channels for penetrant, and that makes the ink quantity increase and the ink completely infiltrate through the glaze layer into the green body layer to a depth of 1 to 2 mm. Under light, the brown ink of the inner layer of the green body absorbs light and forms the light and dark decorative pattern with rich details. The relationship between the jetting amounts of the ink and the penetrant is that the sum of the gray scale of the ink and the penetrant is 100%.

7. The ceramic sheet green body prepared in step 6 is left standing for 3 minutes to ensure the infiltration depth.

8. Re-inkjet decoration: the ceramic sheet green body prepared in step 7 is subjected to a digital inkjet printer for inkjet printing to form designed decorative pattern. The ink is an ordinary ceramic ink provided by Fulu (Suzhou) New Materials Co., LTD. The colors provided are mainly brown (model number: BR-601), orange (model number: BE-201), yellow (model number: YE-401), blue (model number: BL-511), and black (model number: BK-301).

9. Sintering: the ceramic sheet green body prepared in step 8 is fired at 1195° C. for 65 minutes to obtain a semi-finished semi-transparent ceramic sheet. The semi-finished semi-transparent ceramic sheet is subjected to edging, grading, and packaging, followed by storage. The size of the semi-transparent ceramic sheet is 900 mm×1800 mm×5.5 mm. The semi-transparent ceramic sheet of the application is a kind of porcelain tile, whose water absorption is 0.1% or less.

Because in step 4 a layer of decoloration glaze is sprayed on the surface of the green body, the inkjet decoration in step 6 cannot appear on the surface, and the decorative pattern on the surface is the inkjet decoration pattern in step 7, while the decorative pattern in step 6 is completely in the inner layer of the green body. The pattern decoration of the inner layer of the green body is formed through an inkjet technology, so the details of the pattern can be adjusted at will with a high flexibility, and the light and dark decorative effect full of variety can be formed through different light absorptions of the patterns with different gray levels. The light transmittance of the semi-transparent ceramic sheet as prepared is 20%.

Example 2

The steps are almost the same as example 1, except that the nano zinc oxide is provided by Guangdong Dowstone Technology Co., Ltd., which has a primary particle size of 320 nm, a specific surface area of 204 m$^2$/g, and a stacking pore size of 65 nm. A semi-transparent ceramic sheet with a light transmittance of 20% is obtained. The decorative pattern on the surface is the inkjet decorative pattern in step 7, while the decorative pattern in step 6 is completely in the inner layer of the green body.

Example 3

The steps are almost the same as example 1, except that the formula of the decoloration glaze is: 9 parts of ultra-white kaolin, 12 parts of C30 soil, 25 parts of quartz, 20 parts of fused silica, 18 parts of calcined talcum powder, 22 parts of potassium feldspar powder, 4 parts of bentonite, and 2 parts of nano zinc oxide. A semi-transparent ceramic sheet with a light transmittance of 22% is obtained. The decorative pattern on the surface is the inkjet decorative pattern in step 7, while the decorative pattern in step 6 is completely in the inner layer of the green body.

Example 5

The steps are almost the same as example 1, except that the formula of the green body is: 9 parts of ultra-white kaolin, 12 parts of C30 soil, 25 parts of quartz, 20 parts of fused silica, 13 parts of calcined talcum powder, 22 parts of potassium feldspar powder, 4 parts of bentonite, 2 parts of W enhancer, and 4 parts of nano quartz. A semi-transparent ceramic sheet with a light transmittance of 27% is obtained. The decorative pattern on the surface is the inkjet decorative pattern in step 7, while the decorative pattern in step 6 is completely in the inner layer of the green body.

Example 6

The steps are almost the same as example 1, except that the thickness of the decoloration glaze layer is 0.05 mm. A semi-transparent ceramic sheet with a light transmittance of 21% is obtained. The decorative pattern on the surface is the inkjet decorative pattern in step 7, while the decorative pattern in step 6 is completely in the inner layer of the green body.

Example 7

The steps are almost the same as example 1, except that the thickness of the green body layer is 4.0 mm. A semi-transparent ceramic sheet with a light transmittance of 28% is obtained. The decorative pattern on the surface is the inkjet decorative pattern in step 7, while the decorative pattern in step 6 is completely in the inner layer of the green body.

The invention claimed is:

1. A semi-transparent ceramic sheet decorated through ink light-absorbance, comprising:
    a semi-transparent green body,
    an inner inkjet pattern layer infiltrating into the semi-transparent green body from an upper surface of the semi-transparent green body,
    a decoloration glaze layer located on the upper surface of the semi-transparent green body, and
    a surface pattern layer located on the decoloration glaze layer,
    wherein the decoloration glaze layer is prepared by applying a decoloration glaze on the semi-transparent green body, and the formula of the decoloration glaze is: 0 to 9 parts by weight of ultra-white kaolin, 8 to 15 parts by weight of C30 soil, 15 to 35 parts by weight of quartz, 2 to 20 parts by weight of fused silica, 8 to 20 parts by weight of calcined talc powder, 20 to 35 parts by weight of potassium feldspar powder, 3 to 7 parts by weight of bentonite, and 0.5 to 5 parts by weight of nano zinc oxide; and
    wherein the inner inkjet pattern layer is prepared by applying a first inkjet infiltrating ink on the decoloration glaze which is capable of decoloring the first inkjet infiltrating ink in the decoloration glaze layer.

2. The semi-transparent ceramic sheet of claim 1, wherein the infiltration depth of the inner inkjet pattern layer into the semi-transparent green body is 1 to 2 mm.

3. The semi-transparent ceramic sheet of claim 1, wherein the thickness of the decoloration glaze layer is 0.04 to 0.1 mm.

4. A method for manufacturing the semi-transparent ceramic sheet of claim 1, comprising the steps of:
    preparing a semi-transparent green body;
    applying a decoloration glaze on the semi-transparent green body;
    applying a first inkjet infiltrating ink on the decoloration glaze, wherein the decoloration glaze is capable of decoloring the first inkjet infiltrating ink in the decoloration glaze layer; and
    after the first inkjet infiltrating ink having completely infiltrated into the decoloration glaze, applying a second inkjet non-infiltrating ink on the decoloration glaze, and then sintering to obtain the semi-transparent ceramic sheet.

5. The method of claim 4, wherein the formula of the semi-transparent green body is:
    0 to 9 parts of ultra-white kaolin, 8 to 15 parts of C30 soil,
15 to 35 parts of quartz,
2 to 20 parts of fused silica,
8 to 20 parts of calcined talc powder,
20 to 35 parts of potassium feldspar powder,
3 to 7 parts of bentonite,
1 to 4 parts of green body enhancer, and
2 to 8 parts of nano quartz,
wherein all parts are by weight.

6. The method of claim 4, wherein the formula of the decoloration glaze is:
0 to 9 parts of ultra-white kaolin,
8 to 15 parts of C30 soil,
15 to 35 parts of quartz,
2 to 20 parts of fused silica,
8 to 20 parts of calcined talc powder,
20 to 35 parts of potassium feldspar powder,
3 to 7 parts of bentonite, and
0.5 to 5 parts of nano zinc oxide,
wherein all parts are by weight.

7. The method of claim 6, wherein the primary particle size of the nano zinc oxide is less than 800 nm.

8. The method of claim 4, wherein the first inkjet infiltrating ink is an inkjet infiltrating brown ink.

9. The method of claim 7, wherein the primary particle size of the nano zinc oxide is 50 nm to 300 nm.

* * * * *